Figure 1:
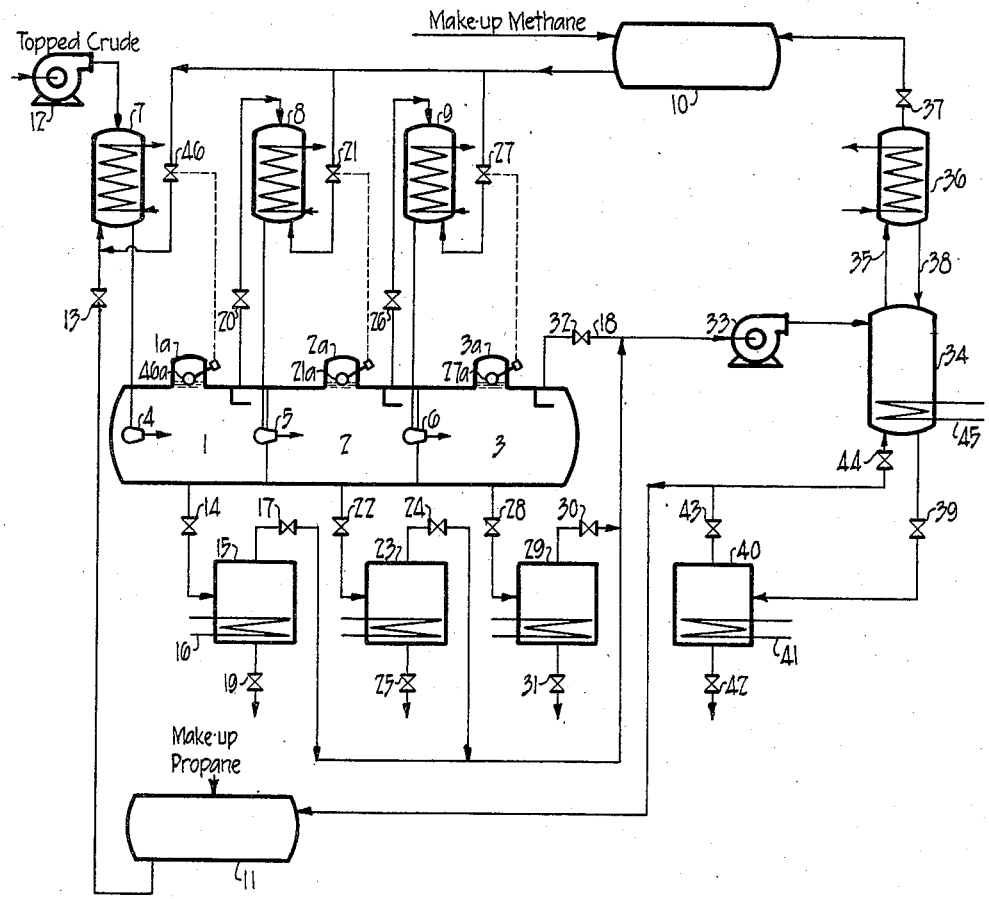

June 17, 1941.  W. A. WEBB  2,246,227

EXTRACTION PROCESS

Filed Jan. 17, 1939  2 Sheets—Sheet 1

Inventor: Wells Alan Webb

By his Attorney:

June 17, 1941.  W. A. WEBB  2,246,227
EXTRACTION PROCESS
Filed Jan. 17, 1939  2 Sheets-Sheet 2

Inventor: Wells Alan Webb
By his Attorney

Patented June 17, 1941

2,246,227

UNITED STATES PATENT OFFICE 2,246,227

EXTRACTION PROCESS

Wells Alan Webb, Albany, Calif., assignor to Shell Development Company, San Francisco, Calif., a corporation of Delaware Application January 17, 1939, Serial No. 251,345

11 Claims. (Cl. 196—13)

This invention pertains to a process for separating mixtures of high molecular weight substances, such as mineral oil fractions, crude oils, shale oils, and other hydrocarbon and non-hydrocarbon mixtures, particularly coal tar, animal and vegetable oils, like linseed oil, voltolized rapeseed oil, neat's-foot oil, etc., into portions having different properties by means of low molecular weight treating agents under paracritical conditions for the treating agent.

It is already known to effect the separation of such mixtures of high molecular weight by dissolving them in suitable liquid diluents of lower molecular weight and introducing a treating agent, of lower molecular weight than the diluent and in a paracritical state into the resulting solution, by application of a suitable pressure to cause the treating agent to be dissolved in and to lower the density and/or the internal pressure of the solution. This lowers the density of the solution and causes the solution to "demix", i. e., to separate into two non-gaseous phases of different specific gravities, containing different portions of the initial material being treated. The lighter of these phases is liquid and contains the high molecular substances of relatively lower internal pressures and/or lower molecular weights together with the greater portion of the diluent and treating agent; the heavier phase is usually also liquid but may be extremely viscous or even solid, and contains the high molecular substances not retained in the lighter phase, i. e., those of relatively higher internal pressures and/or molecular weights. In processes of this type, an agent is in the "paracritical state" when its temperature is not lower than about 40° C. below the critical temperature of the treating agent, i. e., it includes temperatures above the critical, the critical temperature, and temperatures between the critical and about 40° C. below the critical temperature.

It is an object of the present invention to provide an improved method for effecting a fractionation of high molecular mixtures, employing a treating agent of the type described. More particularly, it is an object to arrange the sequence of operations and treating conditions to permit the process to be carried out in a simplified apparatus, and with reduced expenditures in pumping costs and the like. It is a further object of the invention to provide an improved method of operation wherein the process may be carried out in a plurality of stages at substantially constant pressure. It is a further object of the invention to afford a process of the type described in which the vapor commonly occurring above the two non-gaseous phases usually present in such a process may be entirely or substantially eliminated. Another object is to provide a multi-stage process wherein the stages are operated at successively lower temperatures. Still another object is to provide a multi-stage process of the type described wherein the concentration of the treating agent in successive stages is increased and the heavier phases are washed or scrubbed to improve the sharpness of the fractionation. Other objects of the invention will appear from the following detailed description.

These objects are realized according to the present invention by treating, for separation into two or more fractions of different properties, the initial high molecular weight mixture in one stage or in a series of treating stages and recovering the treating agent in the gaseous state at a pressure greater than that of the treating stages. When a series of stages is used, these are operated at progressively higher concentrations of a low molecular treating agent at a paracritical temperature, and a precipitated or heavier phase is withdrawn from each of which stages and either removed from the process as a product or returned to an appropriate stage, the temperature in successive stages being lowered to prevent or substantially prevent the existence of a gas phase. The concentration of the treating agent may be increased by adding more of the same or of a different treating agent to the light liquid phase produced in a preceding stage. The process is preferably operated at a uniform pressure, save for the small pressure variation inherent in flow from one stage to another, although it may also be operated at a pressure gradient, as by providing pumps between stages to operate successive stages at progressively higher pressures. In the usual embodiment of the process, the initial material is diluted with a suitable diluent which is liquid under the conditions prevailing in the separating stages, suitable for increasing the density of the treating agent, but the diluent may in certain cases be omitted, particularly when the oil contains light constituents.

For the most facile separation of phases, the temperature in any stage should be maintained as high as possible without causing the formation of a gas phase, the maximum temperature being limited by the pressure prevailing and the concentration of the treating agent which it is desired to employ in the particular stage. The concentration of the treating agent, in turn, is determined by the sizes of the non-gaseous phases which it is desired to produce, an increase in the concentration being effective to increase the content of the initial material in the heavier phase at the expense of the lighter liquid phase. A safe operating temperature is that corresponding to the equilibrium temperature for a saturated liquid consisting of the diluent and the treating agent in the proportions in which they occur at each stage, and under the pressure prevailing in said stage. These temperatures and pressures for the system: methane-propane are, for example, described by Sage, Lacey and Schaafsma in Industrial and Engineering Chemistry, vol. 26, pages 214 to 217 (February, 1934). I prefer to operate each stage at a temperature not lower than 20° C. below the maximum temperature permissible in that stage, although the invention is not limited to this narrow temperature range.

Figure 3:
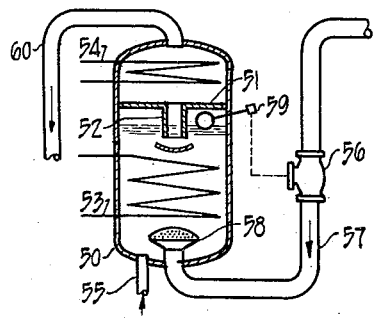
Figure 2:
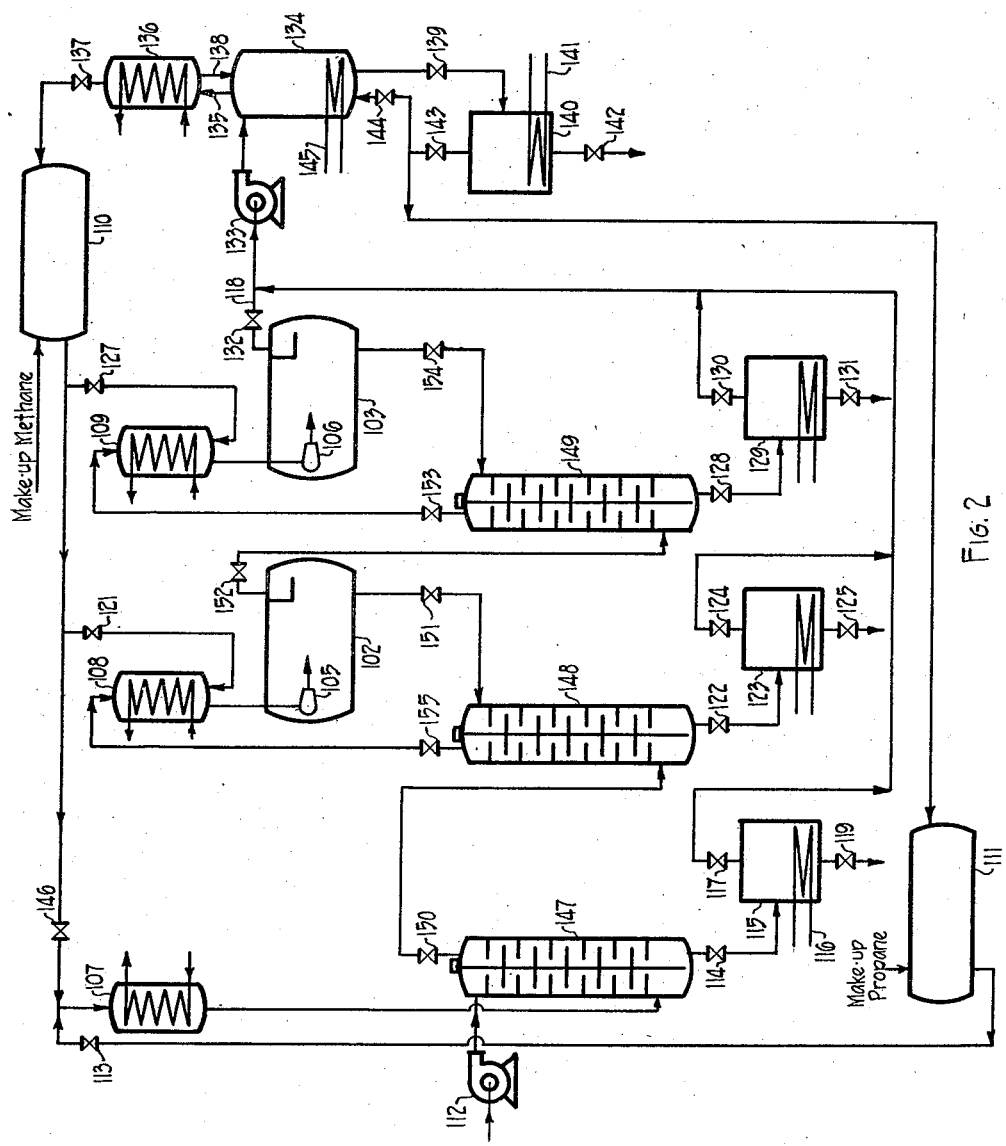

The invention will be understood more fully from the following detailed description, taken together with the accompanying drawings, in which Figures 1 and 2 are schematic flow diagrams of two preferred embodiments, and Figure 3 is a vertical sectional view of a modified heat exchanger, adapted for mixing, condensing, and proportioning the gas to the oil. The description has reference to the treatment of a topped petroleum oil containing some asphaltic bodies and a large proportion of constituents of lubricating viscosity range, in which propane is employed as the diluent and methane is employed as the treating agent. While a continuous mode of operation is described, intermittent or batch operations may also be employed, thereby making it possible to use the same phase separator for several stages. While three stages will be described, it is apparent that any number of stages or even a single stage may be used.

Referring to Figure 1, 1, 2, and 3 are phase separators, provided by partitioning a horizontal cylindrical shell into compartments, each compartment being provided with a nozzle, shown at 4, 5, and 6, for introducing a mixture to be separated with a minimum of turbulence. Other forms of separators, such as centrifuges and the like may also be employed. 7, 8, and 9 are heat exchangers, adapted to bring the gaseous treating agent into intimate contact with the oil, to cool the oil and gas, and to lead off the heat of condensation, whereby the treating agent will be dissolved in the oil; 10 is a surge tank for a gaseous mixture rich in methane; and 11 is a similar surge tank for a gaseous mixture rich in propane. Methane and propane may be initially supplied to these surge tanks, and further quantities of these gases may be supplied during the operation of the system to replenish losses.

The topped crude to be treated is continuously fed to the system at a rate controlled by a pump 12 and introduced at the top of the heat exchanger 7, where it is brought into contact with the gaseous propane-rich mixture continuously fed into the bottom of the heat exchanger via valve 13 from the tank 11 under any suitable pressure, such as 50.3 atmospheres. The rates of flow may, for example, be 1 gallon of topped crude to sufficient of the gaseous mixture to contain 30 pounds of propane. The composition of the propane-rich gas is determined by the conditions prevailing in the vaporizing system used for the recovery of the methane and propane, subsequently described, and may, for the conditions described herein, for example, be about 90 mole percent propane and about 10 mole percent methane. The oil descending in the heat exchanger 7 dissolves the gas which rises countercurrently to it, being dispersed by suitable contact means, such as baffles, trays, or other packing, and is cooled by coils for the circulation of a cooling fluid. The temperature is regulated to cause all or substantially all of the gas to be dissolved in the oil in the liquid phase at the prevailing pressure. This temperature is usually near the critical temperature of the gaseous propane-rich mixture, i. e., near 90° C. for the mixture described above, and may often be somewhat above that temperature, such as, for example, 110° C., the maximum permissible temperature being determined by the nature of the oil, and, more specifically, by the solvent power of the oil for the propane. In certain situations, it is desirable to cool the oil and gas to a temperature corresponding to the equilibrium temperature for a saturated liquid having the composition of the propane-rich gas at the prevailing pressure, i. e., about 80 to 85° C. The oil and gas may, of course, be commingled in any other type of apparatus and may, for example, be separately pre-cooled and then flowed through a suitable contact device to effect solution, and may even be mixed in the phase separating chamber itself.

The cooled mixture thus obtained, consisting of two dispersed liquid phases, is withdrawn from the bottom of the heat exchanger 7 and fed into the separator 1, wherein a light liquid layer and a precipitated, heavier layer are formed. The quantity of oil precipitated in the heavier layer will depend upon the nature of the oil, the temperature, and the amount and composition of the propane-rich gas used. For example, with a topped crude under the conditions described above, at a temperature of about 83° C., with a topped California crude, about 7% of the oil, consisting largely of asphaltic material, will be precipitated in a highly viscous liquid or semi-solid form. When an asphalt-free oil or a de-asphalted oil is treated, the lower phase will usually be entirely liquid, and will contain heavy resinous and/or aromatic materials. The rejected heavy phase is withdrawn via valve 14 and fed into a vaporizer 15 to which heat is supplied by a heating coil 16. The small quantity of propane and methane occurring in the heavy phase is vaporized at a pressure of 50 atms. at any suitable temperature, such as 200° C. and is withdrawn via valve 17, and conducted to line 18; the precipitated high-molecular substances are withdrawn via valve 19.

The lighter liquid phase, consisting of most of the propane, methane, and dissolved oil, is withdrawn from the top of the separator via valve 20 at a pressure of about 50.2 atms. fed to the top of the heat exchanger 8, commingled with a methane-rich gaseous mixture supplied from the tank 10 via valve 21. The composition of this gas will also be determined by the conditions in the vaporizing system and may, for example, consist of 59 mole percent methane and 41 mole percent propane. The quantity of gas admitted through valve 21 is so regulated that the ratio of methane to propane in the resulting oil-propane-methane mixture is that necessary to form liquid phases in the second stage of the desired sizes and compositions. This depends upon the nature of the oil, the quantity of propane, the pressure and temperature, and the nature of the products desired. For example, the quantity may be such that the mole ratio of methane to propane in the resulting mixture is 15 to 85. The resulting mixture of oil, propane, and methane is cooled to a temperature at which no gaseous phase occurs. For operations at the equilibrium temperature of a saturated liquid containing methane and propane in the ratio indicated, this temperature should be about 62° C. The cooled mixture of phases is flowed through the nozzle 5 and separated in the chamber 2, from which the heavy layer is withdrawn by a valve 22 and treated in the vaporizer 23 to separate propane and methane which are withdrawn through valve 24, the precipitated high-molecular materials being withdrawn through valve 25.

The light phase is withdrawn through valve 26 at a pressure of about 50.1 atmospheres, commingled with a further quantity of gas from the tank 10 supplied by valve 27 and cooled in a heat exchanger 9 to condense the gas. The mole ratio of methane to propane in the cooled mixture fed to the third stage may, for example, be 20 to 80, and the pressure in this stage may be 50.0 atmospheres. For operations at the equilibrium temperature of a saturated liquid containing methane and propane in the ratio indicated, the temperature should be about 42° C. The heavier layer from the chamber 3 is similarly withdrawn by a valve 28 and separated in the vaporizer 29, methane and propane being withdrawn by a valve 30 and oil by a valve 31.

The lighter phase flows through valve 32 and conduit 18 wherein it is mixed with vaporized methane and propane from the vaporizers at a pressure of about 50 atmospheres. To maintain the circulation a pump 33 is provided to raise the pressure to about 50.5 atmospheres and transfer to the frictionating column 34. The quantity of gas flowing from the vaporizers 15, 23, and 29 is quite small usually and is readily dissolved in the material flowing through conduit 18. In certain situations, however, it may be desirable to cool the mixture fed to the pump 33 to avoid the formation of a gas therein and to provide a contact chamber, similar to the heat exchanger 7, to effect the solution of the gas in the liquid phase; alternatively, the heat exchanger 9 may be operated to cool the mixture slightly below that necessary to avoid a gas phase so as to prevent also the formation of a gas in the conduit 18. The column 34 may be provided with bubble plates so as to separate most of the methane from the oil. The temperature at the top plate may, for example, be 40° C. and that at the bottom plate about 90 to 95° C. preferably at the critical temperature of a mixture of propane and methane having a critical pressure corresponding to that prevailing in the bottom of the column. At this pressure and temperature, vapors consisting of about 59 mole percent methane and 41 mole percent propane may be withdrawn via conduit 35, flowed through a partial condenser 36 operated at about 40° C., which is provided to insure a uniform composition of the vapors and flowed through valve 37 to the tank 10. The partial condensate is returned to the column via conduit 38. Oil, together with unvaporized propane and methane, is withdrawn from the bottom of the column through valve 39 and introduced into the final vaporizer 40 which may be heated to a suitable temperature such as 200° C. by heating coil 41. The oil, freed from propane and methane, is withdrawn by a valve 42 and the vaporized propane and methane flow through valve 43 to the tank 10. The composition of these vapors will be about that of a mixture of propane and methane having a critical pressure of about 50.5 atmospheres, i. e., about 90 mole percent propane. A portion of these vapors may be returned to the column 34 via valve 44 to supply heat thereto. If desired, heat may also be supplied by means of a coil 45. While a vaporizing system comprising a column, a partial condenser, and a final vaporizer has been illustrated, a different system, such as a simple flash chamber, may be used.

It is also possible to introduce the gaseous mixture in the tank 10 into the first stage via valve 46, thereby lowering the density of the material separated in the first stage and increasing the size of the lower phase. This is particularly desirable when the oil has previously been deasphalted or is derived from an asphalt-free stock. It is, however, also possible to increase the concentration of methane in the first stage by lowering the temperature at the bottom of the column 34.

The precipitated fractions withdrawn at 19, 25, and 31 are progressively lighter and less asphaltic while the oil withdrawn at 42 is highly paraffinic. In a typical case, wherein an asphaltic topped crude is treated, the fraction withdrawn at 19 may be largely asphaltic; that withdrawn at 25 may contain a large proportion of resins; that taken off at 31 may contain mostly heavy aromatic hydrocarbons, while the dissolved oil or raffinate oil withdrawn at 42 may be highly paraffinic, i. e., contains paraffinic, naphthene ring and alkyl aromatics. These designations are, however, only relative, and depend upon the nature of the initial material and of the fractions desired. If desired, one or more intermediate products may be entirely or partially returned to the process. Thus, the heavy phase flowing through valve 22 may be returned to the feed and flowed through the pump 12. Similarly, all or part of the material flowing through the valve 28 may be returned to stage 1 or 2, the pump being required in the latter case.

It will be noted that the process described may be operated with only two liquid pumps 12 and 33 and that no vapor pumps are required. It is desirable that the temperature in each stage be as high as possible without forming a gas phase because the fractionation effected in separations employing low molecular treating agents like methane in the paracritical state is largely influenced by the density of the treating agent. At higher temperatures, the densities become lower and the solubilities of the heavier constituents in the lighter phases are correspondingly reduced. For this reason, it is not generally desirable to operate all of the stages of the process at a temperature as low as that which must be maintained in the last stage, e. g., 42° C. in the embodiment described above. Therefore, it is preferred to operate each stage at a temperature not substantially lower than about 20° C. below the temperature at which the gas phase would be formed.

Although it is preferred to avoid the presence of a gas phase entirely in the chambers 1, 2, and 3, it should be understood that the present invention includes also operations in which this condition is achieved only substantially, i. e., in which a minor amount of gas is formed. In this event, the openings of the conduits for removing the light phases may be disposed at levels slightly below the top of the chambers. The quantities of gas fed via valves 21 and 27 may then be conveniently regulated as follows: The pressures in the system and the temperatures of the mixtures flowing from the heat exchangers 7, 8, and 9 being constant, and the temperature being such that at the desired methane to propane ratio no gas phase will exist, the entire absence of a gas phase in the separators will indicate a deficiency of gas, while too large a gas phase will indicate an excess of gas. Accordingly, level responsive devices in the chambers 2 and 3 (and in the chamber 1, when gas is admitted via valve 46) may be provided to regulate the valves 21, 27, and 46, respectively. For this purpose domes 1a, 2a, and 3a may be provided in the settling chambers and level responsive devices 46a, 21a, and 27a installed therein, and arranged to open the valves wider when the oil level rises in the domes, and to throttle these valves when the gas phase increases in size and lowers the oil level.

Automatic regulation may also be achieved by using the heat exchanger shown in Figure 3 in lieu of heat exchangers 8 and 9 (and of heat exchanger 7 when the valve 46 is used). In Figure 3, 50 represents a contact chamber provided with a partition 51 having a depending pipe 52, and containing a coil 53 for circulation of cooling medium, and arranged for effecting the mixing of the gas and liquid flowing upwardly through the chamber. If desired, further packing means may be provided for this purpose. A second coil 54 of smaller size is provided in the chamber above the partition 51.

The liquid phase, such as the liquid phase withdrawn via valve 20 from the separator 1, or the initial oil, is introduced at the bottom through a conduit 55, and the gas from the tank 10 (or from the tank 11) is fed through the valve 56, conduit 57 and diffusing nozzle 58. The liquid and gas are intimately dispersed in flowing upwardly and are cooled, causing the gas to be dissolved in the liquid phase, flowing through the pipe 52. Undissolved gas accumulates below the partition 51, forming a vapor space. A lever responsive device 59, such as a float, is operatively connected to the valve 56, and throttles this valve as the vapor space increases and opens this valve as the vapor space diminishes. In this manner the vapor space is maintained above the bottom of the pipe 52 and only liquid is flowed through this pipe. In the space above the partition the liquid is further cooled to a small extent, such as by about 1 to 5° C. to insure against the separation of gas in the phase separators, and the cooled liquid is withdrawn via conduit 60 and fed into the next phase separator.

While I have in the foregoing description made reference to a process employing propane and methane in three stages at a pressure of about 50 atmospheres and have indicated certain specific concentrations of the solvent, it should be understood that my invention is not limited thereto and may be practiced with any number of stages and at pressures and compositions other than those indicated. Thus, temperatures from about 0° C. to 400° C. and pressures from about 20 atmospheres to about 400 atmospheres are usually suitable, although the process is not restricted to these limits.

It is also possible to improve the sharpness of the separation effected in the several stages by employing countercurrent contact chambers. Referring to Figure 2, reference numbers 102, 103, 105 to 119, 121 to 125, and 127 to 146 designate apparatus corresponding to elements in Figure 1 having reference characters corresponding to the last two digits of those in Figure 2. 147, 148, and 149 are countercurrent scrubbers provided with stationary baffle plates mounted therein alternating with movable baffles mounted on a central shaft. Packed columns, columns containing trays, or even empty columns or two or more mixing and settling stages connected for countercurrent flow may also be employed.

According to this embodiment the topped crude is fed by pump 112 to the upper part of column 147 and the propane-rich mixture is condensed in heat exchanger 107, introduced to the bottom of column 147 and flowed counter-currently to the oil. In this manner, the desirable and less asphaltic constituents are washed from the descending heavy precipitated materials which are withdrawn via valve 114 and treated in the vaporizer 115 as described for Figure 1. The oil phase together with most of the propane and methane is withdrawn via valve 150 and introduced near the bottom of the column 148. The light liquid phase from the column 148 is withdrawn at 155, commingled with the desired quantity of methane rich gas from the tank 110, cooled in the heat exchanger 108 to condense the gas phase and separated into heavy and light layers in the phase separator 102. The precipitated layer is withdrawn by a valve 151 and fed to the top of the column 148 where it flows downwardly countercurrently to the rising oil and propane mixture. The rising oil washes desired materials from the descending phase which is withdrawn by a valve 122 and treated in the vaporizer 123 to remove the solvents therefrom.

The light phase from the separator 102 passes by a valve 152 to the bottom of column 149, upwardly through this column, and is withdrawn by a valve 153 and commingled with a further quantity of gas from the tank 110 supplied by a valve 127. The mixture is cooled in heat exchanger 109 to condense the gas and separated into light and heavy liquid layers in separator 103. The precipitated heavy phase is withdrawn by a valve 154 and flows downwardly through column 149 countercurrently to the rising oil solution. The washed heavy phase is taken off of valve 128 and treated in vaporizer 129. The light liquid phase from the separator 103 flows via valve 132, conduit 118, and pump 133 to the fractionating column 134 where the methane and propane are separated as previously described.

The process may be operated with any of the low molecular weight treating agents known in the art. In general, it is preferable to employ a treating agent having a critical temperature below 130° C., although treating agents having critical temperatures up to about 350° C., like pentane, hexane, and even heptanes have been found to be operative. With treating agents having critical temperatures about 130° C., i. e., requiring operations above about 90° C., it is usually desirable to introduce water or a similar substance into the system to improve the separation, it having been found that water, while substantially immiscible in oil, is slightly miscible with these treating agents under paracritical conditions. By this method temperatures as high as 400° C. and above may be used. Examples of suitable treating agents are: Methane, ethane, ethylene, propane, proplyene, acetylene, butanes, hydrogen, carbon monoxide, carbon dioxide, water gas, natural gas, ammonia, dichlordifluor methane, methylene fluoride, ethyl chloride, and dimethyl ether, and their mixtures. As was explained above, the amount of treating agent employed depends upon the specific agent, the quantity of diluent, the nature of the oil being treated, and the operating conditions. The amount to be employed in a specific case may be readily determined by the consideration that an increase in the concentration of the treating agent causes a reduction in the solubility of the oil in the upper phase.

Diluents suitable for the process are: Low boiling liquid or liquefied aliphatic hydrocarbons of the type known as deasphalting agents, such as propane, propylene, butanes, butylenes, pentanes, amylenes, hexanes, hexenes, their mixtures, as well as light, straight-run naphthas and other light, preferably aromatic-free fractions of mineral oil, boiling preferably below about 270° C., although even higher boiling distillates may be desirable. It should be noted that the diluent should be liquid under the conditions of the treatment and may be in the paracritical state (as the propane in the first two stages in the process described in Figure 1) or at lower temperatures, and that they have critical temperatures higher than the treating agent employed. Thus, when propane is employed as the treating agent at a temperature about 100 to 150° C., isopentane is suitable as a diluent.

Instead of hydrocarbon diluents, non-hydrocarbon solvents such as acetone, pyridine, liquid sulfur dioxide, cresylic acid, and other solvents of the type of preferential solvents for non-paraffinic hydrocarbons may be used as the diluent.

In the usual case, from 1 to 9 volumes of the diluent for one volume of the mixture being fractionated are employed, a ratio of 1 to between 3 and 5 being preferred. It should be noted that while a diluent is usually employed for the purpose of lowering the density of the material being treated, thus aiding the action of the treating agent, and of enhancing the solubility of the treating agent in the material, certain materials, such as certain crude oils and petroleum fractions initially contain appreciable amounts of light constituents which serve the function of the diluent, and in such cases little or even no diluent may be required. The process is not, therefore, limited to the addition of a diluent.

I claim as my invention:

1. A process for separating a high molecular weight mixture into fractions having different properties, comprising the steps of subjecting said mixture to the precipitating action of a low molecular weight treating agent dissolved in the mixture in its paracritical state under a superatmospheric pressure to form non-gaseous phases of different densities containing different portions of said mixture, separating said phases, increasing the pressure on the separated lighter phase, vaporizing the treating agent from the separated lighter phase at a pressure higher than said superatmospheric pressure, and commingling said vaporized treating agent with a subsequent quantity of the high molecular weight mixture without increasing the pressure on said vaporized treating agent.

2. The process according to claim 1 in which the vaporized treating agent in the gaseous state is commingled with the subsequent quantity of high molecular weight mixture.

3. The process according to claim 1 in which the vaporized treating agent in the gaseous state is commingled with the subsequent quantity of high molecular weight mixture, and the commingled mixture and vapors are cooled to cause the vapors to be condensed and dissolved in the mixture.

4. A process for separating a high molecular weight mixture into fractions having different properties, comprising the steps of subjecting said mixture to the precipitating action of a low molecular weight treating agent dissolved in the mixture in its paracritical state under a superatmospheric pressure to form non-gaseous phases of different densities containing different portions of said mixture, separating said phases, increasing the pressure on the separated lighter phase, vaporizing the treating agent from the separated lighter phase at a pressure higher than said superatmospheric pressure, and commingling said vaporized treating agent with a subsequent quantity of the high molecular weight mixture at a pressure substantially the same as said superatmospheric pressure.

5. A process for separating a high molecular weight mixture into fractions having different properties, comprising the steps of subjecting the mixture to the precipitating action of a low molecular treating agent in its paracritical state under superatmospheric pressure to form first non-gaseous phases of different densities containing different portions of said mixture, separating said first phases, dissolving a further quantity of gaseous treating agent in the paracritical state in the separated first lighter phase at a pressure not substantially greater than the said superatmospheric pressure by lowering the temperature to increase the solubility of gaseous treating agent therein, thereby causing its separation into second non-gaseous phases of different densities containing different portions of the mixture, separating said second phases, increasing the pressure on the separated second lighter phase, separating a gas rich in said treating agent from the second lighter phase at a pressure higher than said superatmospheric pressure, and adding said gas to a subsequent separated first lighter phase to dissolve treating agent therein without increasing the pressure on said gas.

6. A process for separating a high molecular weight mixture into fractions having different properties, comprising the steps of diluting said mixture with a light diluent, subjecting the diluted mixture to the precipitating action of a low molecular treating agent in its paracritical state under superatmospheric pressure to form first non-gaseous phases of different densities containing different portions of said mixture, separating said first phase, dissolving a further quantity of gaseouse treating agent in the paracritical state in the separated first lighter phase at a pressure not substantially greater than the said superatmospheric pressure by lowering the temperature to increase the solubility of gaseous treating agent therein, thereby causing its separation into second non-gaseous phases of different densities containing different portions of the mixture, separating said second phases, increasing the pressure on the separated second lighter phase, separating a gas rich in said treating agent from the second lighter phase at a pressure higher than said superatmospheric pressure, recycling said gas to the process for the treatment of a subsequent portion of the mixture to dissolve treating agent therein without increasing the pressure on said gas, separating a gas rich in the diluent from the residual portion of said second lighter phase at a pressure higher than said superatmospheric pressure, and adding the diluent thus recovered to said subsequent portion of the mixture.

7. A process for fractionating a hydrocarbon oil comprising the steps of diluting said oil with a light hydrocarbon diluent, adding a gas rich in a low molecular treating agent in its paracritical state to the diluted oil at a superatmospheric pressure, at a temperature causing said gas to be dissolved in the oil, thereby causing the formation of two first liquid phases containing different portions of the oil, separating said phases, adding a further quantity of said gas to the separated first lighter liquid phase at a pressure not substantially greater than said superatmospheric pressure by lowering the temperature to increase the solubility of the gas therein, thereby causing its separation into second liquid phases of different densities containing different portions of the oil, separating the second liquid phases, increasing the pressure on the separated second lighter liquid phase, separating said gas rich in the low molecular treating agent from the second lighter phase at a pressure higher than said superatmospheric pressure, and adding said separated gas to a subsequent portion of the oil without increasing the pressure on said gas.

8. A process for separating a high molecular weight mixture into fractions having different properties, comprising the steps of flowing said mixture and a light liquid diluent countercurrently to a first heavy phase, dissolving in said diluted mixture after said countercurrent contact a low molecular treating agent in the paracritical state under superatmospheric pressure, thereby causing the formation of a first non-gaseous light phase and said first heavy phase, said phases containing different portions of the mixture, separating said phases, flowing the separated first heavy phase countercurrently to a subsequent portion of diluted mixture, flowing the separated first light phase countercurrently to a second heavy phase, dissolving in said first light phase after said countercurrent contact a further quantity of gaseous treating agent in the paracritical state, at a pressure not substantially greater than said superatmospheric pressure by lowering the temperature to increase the solubility of gaseous treating agent therein, thereby causing the formation of a second non-gaseous light phase and said second heavy phase, said phases containing different portions of the mixture, separating said second phases, and flowing the separated second heavy phase countercurrently to a subsequent portion of first light phase.

9. A process for separating a high molecular weight mixture into fractions having different properties, comprising the steps of flowing said mixture and a light liquid diluent countercurrently to a first heavy phase, dissolving in said diluted mixture after said countercurrent contact a low molecular treating agent in the paracritical state under superatmospheric pressure, thereby causing the formation of a first non-gaseous light phase and said first heavy phase, said phases containing different portions of the mixture, separating said phases, flowing the separated first heavy phase countercurrently to a subsequent portion of diluted mixture, flowing the separated first light phase countercurrently to a second heavy phase, dissolving in said first light phase after said countercurrent contact a further quantity of treating agent in the paracritical state, thereby causing the formation of a second non-gaseous light phase and said second heavy phase, said phases containing different portions of the mixture, separating said second phases, and flowing the separated second heavy phase countercurrently to a subsequent portion of first light phase.

10. A process for fractionating a hydrocarbon oil comprising the steps of flowing said oil countercurrently to a light liquid oil solvent of the type of precipitants for asphalts to produce a precipitate insoluble in the solvent and an oil solution, flowing said oil solution countercurrently to a first heavy phase, dissolving in said oil solution after countercurrent contact with the first heavy phase a low molecular treating agent in the paracritical state under superatmospheric pressure, thereby causing the formation of a first light liquid phase and said first heavy phase, said phases containing different portions of the oil, separating said phases, flowing the separated first heavy phase countercurrently to a subsequent portion of oil solution, flowing the separated first light phase countercurrently to a second heavy phase, dissolving in said first light phase after said countercurrent contact a further quantity of treating agent in the paracritical state, thereby causing the formation of a second light liquid phase and said second heavy phase, said second phases containing different portions of the oil, separating said second phases, and flowing the separated second heavy phase countercurrently to a subsequent portion of first light phase.

11. A process for separating a high molecular weight mixture into fractions having different properties, comprising the steps of subjecting said mixture to the precipitating action of a low molecular weight treating agent dissolved in the mixture in its paracritical state under superatmospheric pressure to form first non-gaseous phases of different densities containing different portions of said mixture, separating said first phases, adding a further quantity of gaseous treating agent in the paracritical state to the separated first lighter phase, lowering the temperature of the first lighter phase to increase the solubility of the gaseous treating agent therein, thereby dissolving added gaseous treating agent therein, and causing the separation of the first lighter phase into second non-gaseous phases of different densities containing different portions of the mixture, regulating the quantity of the added gaseous treating agent by varying its rate of addition so as to maintain a vapor phase containing gaseous treating agent in contact with the resulting cooled solution of the treating agent in the mixture at a substantially constant volume, withdrawing said cooled solution from contact with said vapor phase, further cooling said withdrawn solution which consists of said second non-gaseous phases and separating the latter, whereby the formation of a vapor phase during said last-mentioned separating step is substantially prevented.

WELLS ALAN WEBB.